US007165541B2

(12) United States Patent
Hommes

(10) Patent No.: US 7,165,541 B2
(45) Date of Patent: Jan. 23, 2007

(54) PROTRUDING OIL SEPARATION BAFFLE HOLES

(75) Inventor: Daniel J. Hommes, Shelby Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/992,603

(22) Filed: Nov. 18, 2004

(65) Prior Publication Data

US 2006/0102159 A1    May 18, 2006

(51) Int. Cl.
*F02M 25/00* (2006.01)
(52) U.S. Cl. ..................................... 123/572
(58) Field of Classification Search ........ 123/572–574, 123/41.86
See application file for complete search history.

(56) References Cited

U.S. PATENT DOCUMENTS

| 3,234,925 | A | * | 2/1966 | Cahn | 123/573 |
| 4,156,406 | A | * | 5/1979 | Brandau et al. | 123/41.86 |
| 4,597,372 | A | * | 7/1986 | Furukawa | 123/572 |
| 5,005,553 | A | * | 4/1991 | Washizu et al. | 123/572 |
| 5,474,035 | A | * | 12/1995 | Ming et al. | 123/41.86 |
| 6,412,478 | B1 | * | 7/2002 | Ruehlow et al. | 123/572 |

* cited by examiner

*Primary Examiner*—Marguerite McMahon
(74) *Attorney, Agent, or Firm*—Christopher DeVries

(57) ABSTRACT

A baffle plate for an internal combustion engine is used to separate air and oil as required for recirculation of crankcase gasses. The baffle plate includes oil holes with protrusions extending therefrom. The protrusions extend in a direction opposing the flow of an air/oil mixture. These protrusions prevent oil that strikes the baffle plate from flowing over the hole in the baffle plate and into the air induction system.

21 Claims, 5 Drawing Sheets

PROTRUDING OIL SEPARATION BAFFLE HOLES

FIELD OF THE INVENTION

The present invention relates to air/oil separation in internal combustion engines. In particular, the present invention relates to air/oil separation in a positive crankcase ventilation system.

BACKGROUND OF THE INVENTION

Positive crankcase ventilation systems (PCV systems) provide a mechanism for transferring vapors from the engine crankcase, or another engine compartment containing oil, to the induction system of an engine. Many PCV systems provide some restriction to prevent engine oil from being drawn into the induction system and burned in the combustion process. As part of a PCV system, air/oil separation plays an important role in reducing the amount of engine oil that is carried into the induction system and later burned by the engine. Some air/oil separation systems include one or more chambers and baffles designed to cause oil particles entrained in the crankcase gasses to fall out of the gasses before those gasses are allowed to flow into the intake tract to be subsequently burned by the engine.

At least some PCV systems achieve air/oil separation by using a baffle plate with a series of holes. The baffle plates used in the prior art provide an effective means of separating air and oil. However, due to the relatively unrestricted path through certain baffle plates, oil that impacts the baffle plate may be able to become re-entrained in the mixture. As a result, oil is carried into the induction system and burned in the combustion process, resulting in oil consumption.

SUMMARY OF THE INVENTION

The present invention provides an improved positive crankcase ventilation system which affords advantages over the prior art. The current invention has the benefit of further limiting the amount of engine oil that is allowed to enter the induction system of an engine. This is possible through the use of protrusions extending from the face of a baffle plate. The protrusions circumscribe apertures in the baffle plate and extend in a direction generally opposing the direction of flow of an air/oil mixture. A barrier is created by the protrusion surrounding the aperture to prevent oil from flowing into the apertures after it impacts the plate. This results in less oil being drawn into the induction system, further resulting in lower oil consumption.

The result of lower oil consumption is both lower engine emissions and a greater sense of perceived quality from the customer, due to a reduced need to add engine oil to the system between scheduled oil changes. Another benefit of the reduced oil consumption is higher oil levels maintained in the oil pan or dry sump tank during vehicle operation towards the end of oil life. One desirable result of this is improved oil life. Because there is a greater volume of oil maintained in the engine throughout the engine oil life, the oil change interval may be longer.

A further benefit may be improved lubrication system performance. Lubrication system performance may be comprised if a pickup tube or other supply source to the oil pump is allowed to draw air instead of oil. When a vehicle is subject to high g-loads, oil inside of the oil pan or tank may slosh and move away from the oil pickup tube or other means of communication with the oil pump. Use of the baffle plate of the present invention may result in the ability of a vehicle to maintain higher g-load maneuvers toward the end of an oil life cycle, before the scheduled oil change. A remote dry sump oil tank is sometimes used to limit oil slosh. These tanks are generally taller and more narrow in design than conventional oil pans, allowing less opportunity for an oil pickup tube to become uncovered. However, these tanks are still susceptible to undesirable oil movement. The present invention provides the benefit of minimizing this effect when compared to the traditional hole-type baffle plates previously disclosed.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiments is merely exemplary in nature and is in no way intended to limit the invention, its application, or uses.

Figure 1:
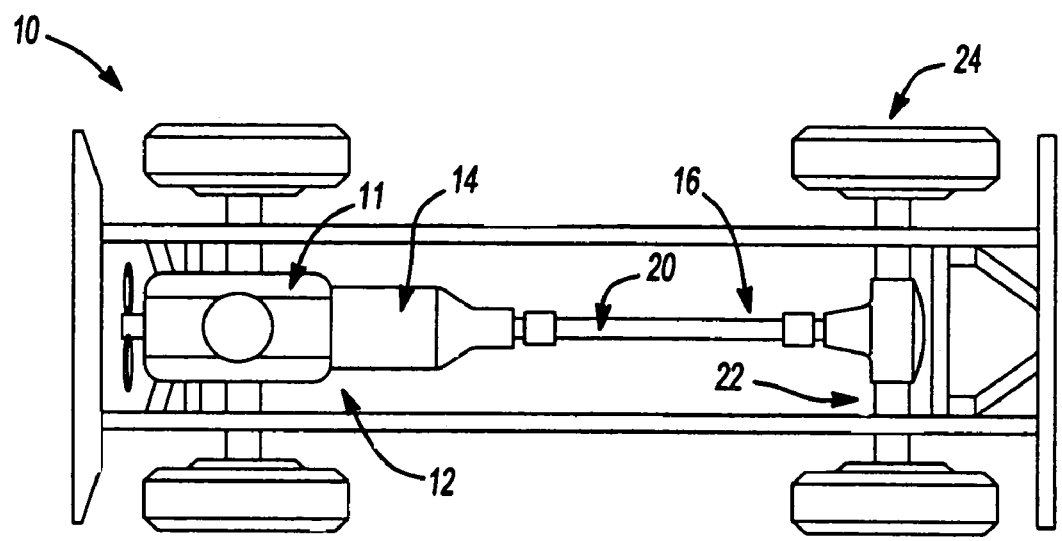
FIG. 1 is a schematic illustration of a motor vehicle constructed in accordance with the teachings of the present invention.

With reference to FIG. 1, an exemplary vehicle 10 includes an internal combustion engine and PCV system 11 constructed in accordance with the teachings of the present invention. The vehicle 10 includes an engine 12 and a transmission 14 for providing a driveline 16 with a torque input. The driveline 16 includes a drive shaft 20, a rear axle 22, and a plurality of wheels 24.

Figure 2:
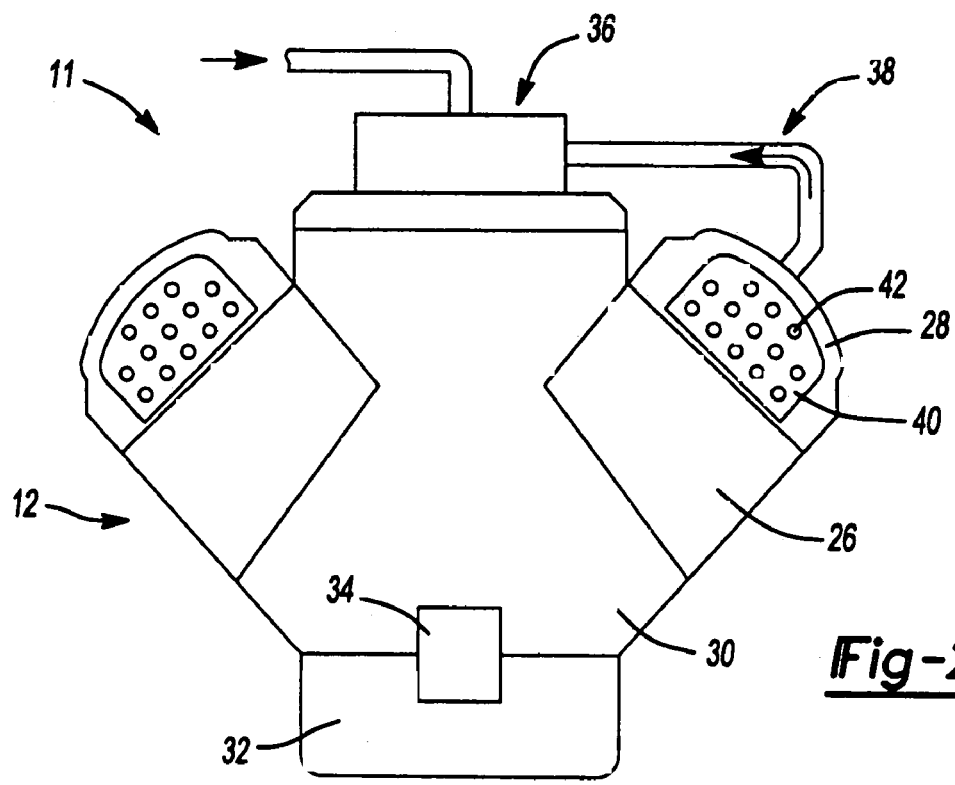
FIG. 2 is a schematic illustration of an internal combustion engine including an exemplary baffle.
Figure 3:
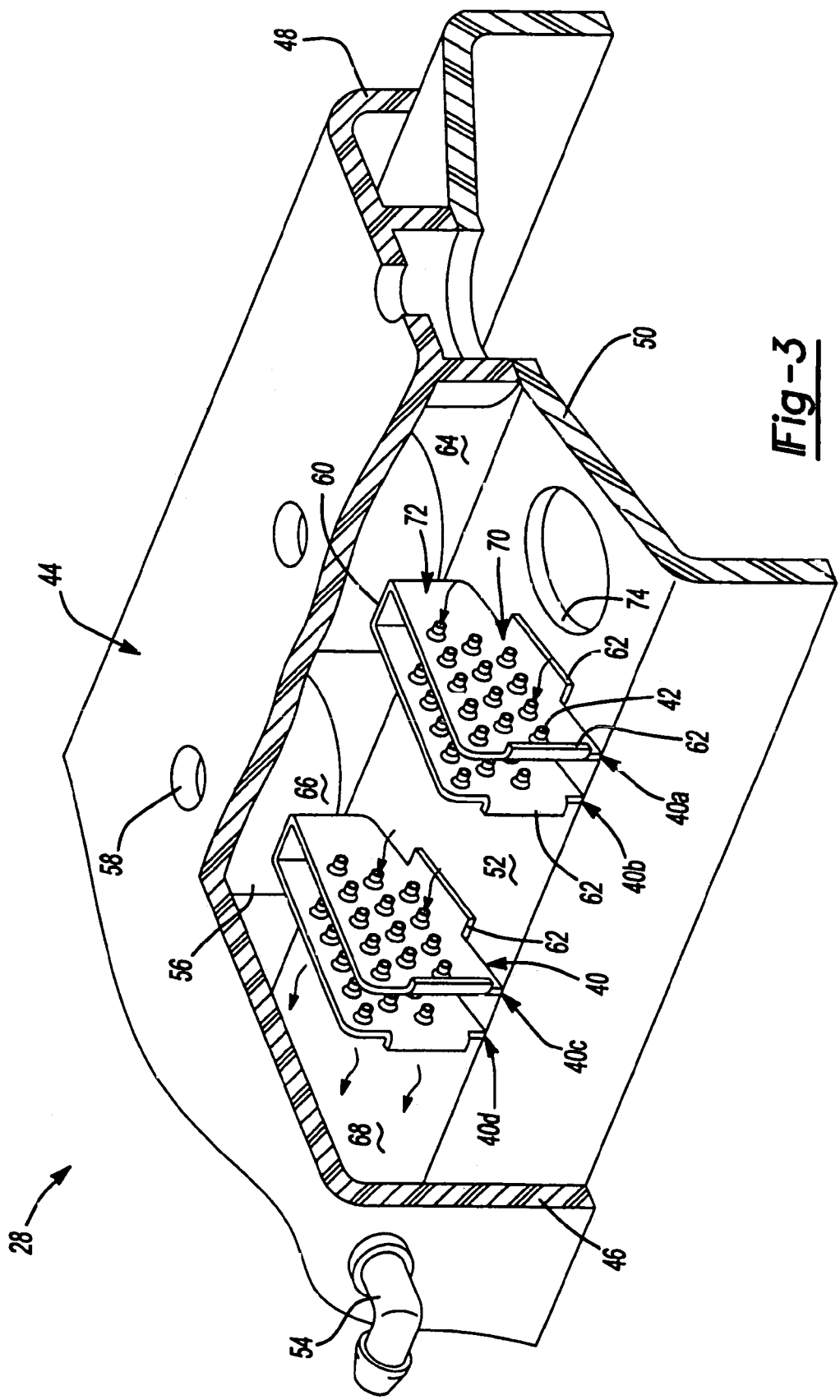
FIG. 3 is a fragmentary perspective view of an exemplary cylinder head cover containing the baffle for use in a positive crankcase ventilation system.

FIG. 2 depicts the internal combustion engine and PCV system 11 in greater detail. The internal combustion engine and PCV system 11 includes the engine 12 having a head 26, a valve cover 28, a block 30, an oil pan 32, and an oil pump 34. The internal combustion engine and PCV system 11 further comprises an air intake system 36, and a conduit 38 connecting the valve cover 28 to the air intake system 36. The air intake system 36 is in communication with air external to the engine 12. The head 26 contains a baffle plate 40 shown in greater detail in FIG. 3.

The baffle plate 40 separates oil from crankcase gases before the mixture combines with fresh air in the intake system 36. During engine operation gas located within the combustion chamber air escapes into the crankcase past the piston rings. This process is known as blow-by. The gas travels into the crankcase and back up into the head 26 through passages typically cast into the block 30 and head 26. These blow-by gases are typically drawn from the crankcase through a passage in the valve cover 28. A conduit 38 extending from the valve cover 28 to the intake system 36 allows the blow-by gases to combine with the fresh air of the intake system 36.

When the blow-by gas enters the crankcase, oil often becomes entrained with the gases to form a mixture. In order to separate the air from the oil, the present invention provides a baffle plate 40 in the valve cover 28. The mixture of blow-by gases and oil is forced through apertures 42 in the baffle plate 40 as a result of a pressure differential across the baffle plate 40. The pressure within the engine crankcase is greater than that in the intake system 36, causing the mixture to flow from the crankcase to the intake system 36. The mixture either passes through the apertures 42 in the baffle 40 or impacts the remaining portion of the baffle 40. Upon impact, oil in the mixture runs down the baffle 40 and returns to the oil pan 32.

The valve cover 28 includes a top 44, a first sidewall 46, a second sidewall 48 and an intermediate wall 50 interconnecting the first and second sidewalls. A series of baffle plates 40 are positioned within a cavity 52 formed between the top 44 and the intermediate wall 50. An outlet 54 extends through the first sidewall 46 to place cavity 52 in communication with the intake system 36. A series of cylindrical walls 56 extend from the top 44 to the intermediate wall 50 in the center of the valve cover 28. Apertures 58 defined by the cylindrical wall 56 provide access for valve cover mounting fasteners (not shown).

The baffle plates 40 are formed from substantially planar sheets. In the embodiment shown, two baffle plates 40a and 40b are integrally formed with one another. Baffle plates 40a and 40b are arranged generally parallel to and spaced apart from one another. An end portion 60 interconnects baffle plates 40a and 40b. End portion 60 extends from top 44 to intermediate wall 50 to force the majority of the crankcase gases through the apertures 42. Tabs 62 extend from the baffle plates to provide mounting provisions for coupling the baffle plates 40 to the valve cover 28. Additional baffle plates 40c and 40d are integrally formed with one another and coupled to valve cover 28. A first volume 64 is defined between baffle plate 40a and valve cover 28. A second volume 66 exists between baffle plate 40b and 40c. A third volume 68 is positioned between baffle plate 40d and valve cover 28.

Figure 7:
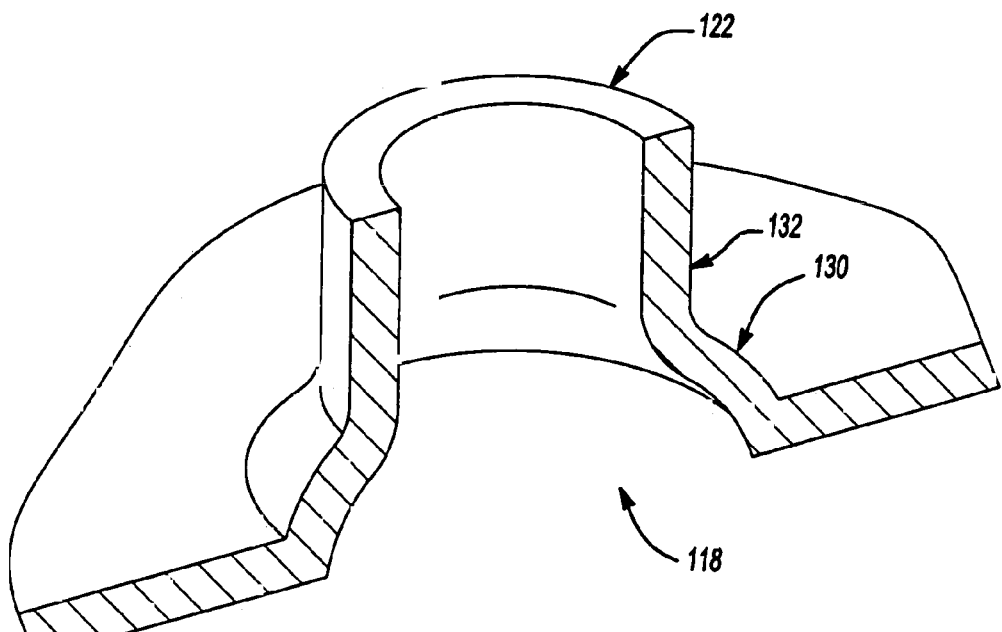
FIG. 7 is a view of a cross-section of an air/oil hole in the baffle of the present invention in accordance with the teachings of the present invention.

Each baffle plate 40a–40d includes the plurality of apertures 42. Because each of the baffle plates are substantially similar to one another, baffle plate 40a will be described in further detail. Baffle plate 40a includes a plurality of projections 70 circumscribing each aperture 42. Projections 70 extend perpendicularly from a surface 72 of baffle plate 40. FIG. 7 depicts an exemplary projection 70 having a conical portion 130 and a substantially cylindrically shaped portion 132. An inlet 74 extends through the valve cover 28 to allow a crankcase gas mixture to pass into the valve cover 28. The inlet 74 is an aperture located in the intermediate wall 50 of the cover 28.

During engine operation, the air/oil mixture enters the first volume 64 of the valve cover 28 through the inlet 74 in the intermediate wall 50 of the valve cover 28. In order to exit the first volume 64, the mixture must pass through baffle plates 40a and 40b or through the relatively small clearances surrounding the baffle plates 40.

The mixture flows in a direction generally perpendicular to the baffle plates 40. As the mixture attempts to flow through the baffle plates 40, a portion passes through the apertures 42. The remainder will impact the surface 72 of the baffle plate 40 or a portion of the protrusion 70. When the mixture impacts a baffle surface, oil entrained in the mixture may be released. The oil content will then flow down the plate 40. The protrusions 70 extending from the plate 40 prevent oil from running down surface 72 and through the apertures 42. Oil preferably runs down surface 72 and into contact with intermediate wall 50. Oil then eventually returns to the oil pan 32 to be reused by the engine 12.

The mixture then flows into the second volume 66 bounded by baffle plate 40b and a baffle plate 40c. The exit path comprises apertures 42 through baffle plates 40c and 40d. The mixture not passing through the apertures 42 impacts surface 72 of the baffle plate 40 and flows down the plate 40. The remainder of the mixture enters a third volume 68. The mixture in the third volume 68 then exits to the intake system 36 through the outlet 54 on the first sidewall 46.

The additional oil that has been released from the mixture may return to the oil pan 32. The oil is able to return by draining back to the head 26 through the inlet 74 or another passage (not shown) in the valve cover 28. Once the oil returns to the head 26, it may follow a typical oil drainback path through passages in the head 26 in communication with the block 30. The oil is able to flow past the baffle plates 40 in the valve cover 28 due to clearances formed between the baffle plate 40 and the intermediate wall 50.

Figure 4:
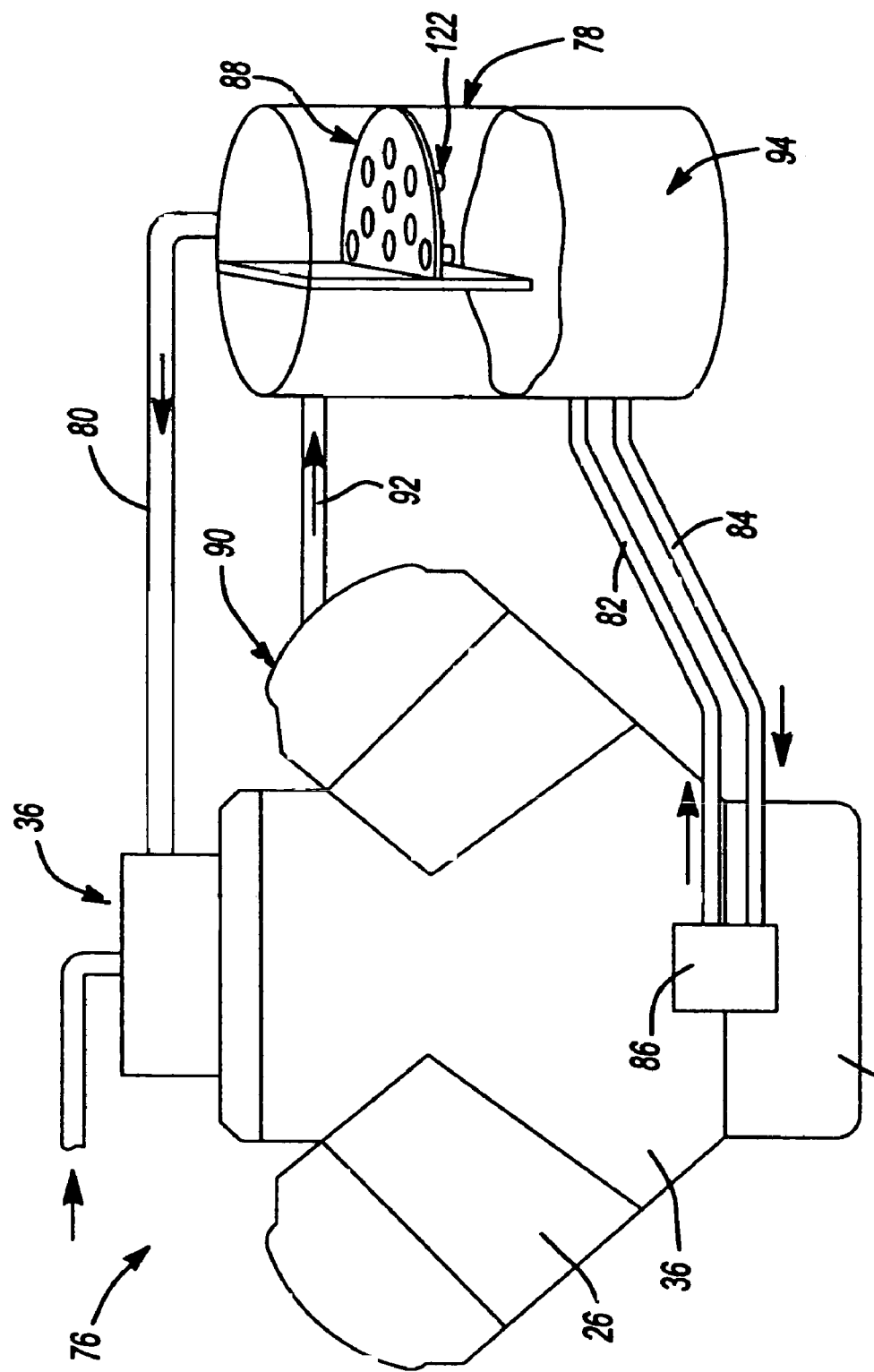
FIG. 4 is a schematic illustration of an internal combustion engine having a dry sump oil tank including an exemplary baffle.
Figure 5:
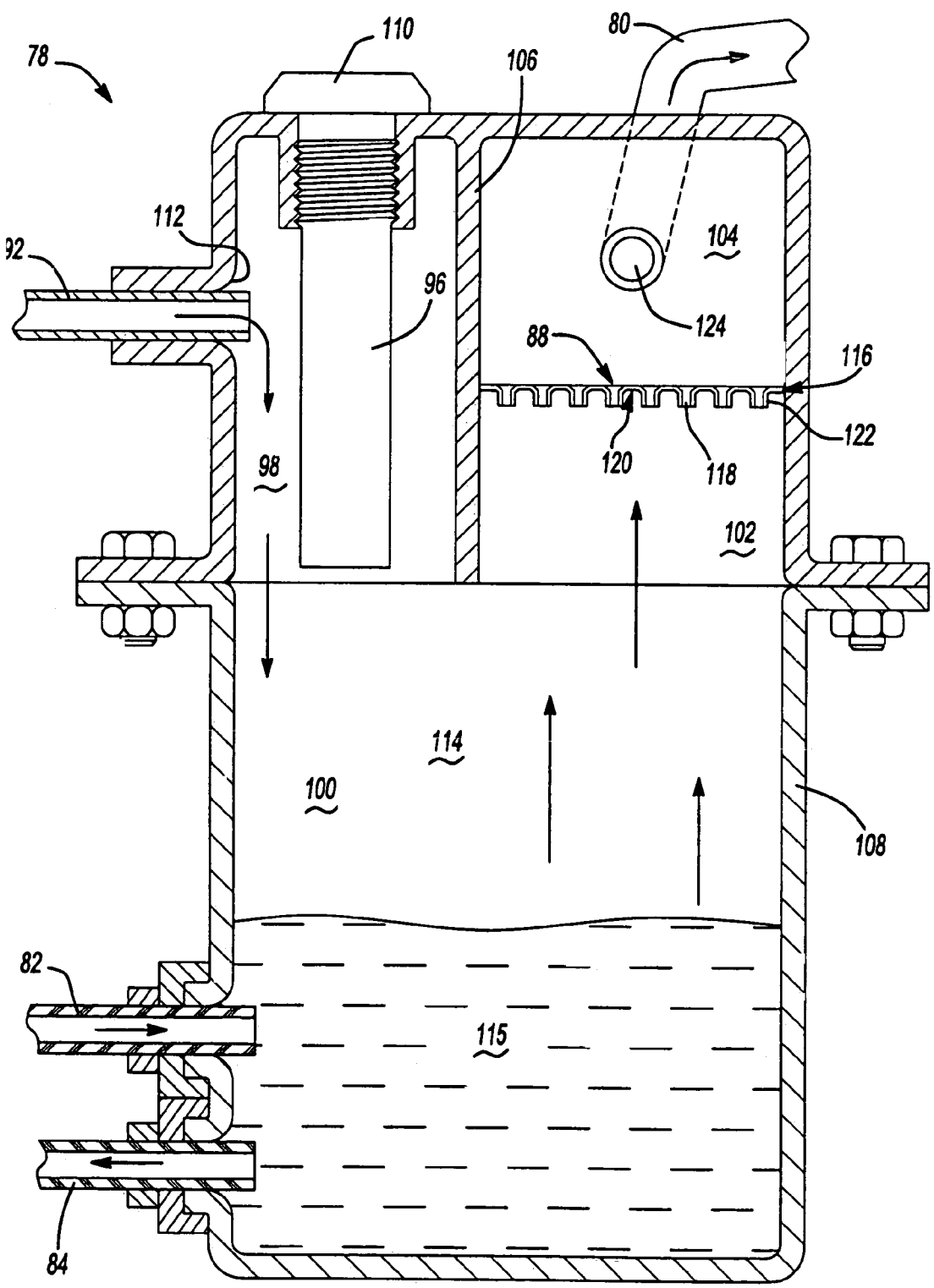
FIG. 5 is a fragmentary cross-sectional side view of a dry sump oil tank containing the baffle of the present invention.

An alternate embodiment internal combustion engine and PCV system 76 is depicted in FIGS. 4 and 5. Internal combustion engine and PCV system 76 is substantially similar to internal combustion engine and PCV system 11. As such, like elements will retain their previously introduced reference numerals. The engine and PCV system 76 includes a dry sump oil tank 78 and a conduit 80 for communication of air between the air intake system 36 and the tank 78. Lines 82 and 84 interconnect oil pump 86 and oil tank 78. The dry sump oil tank 78 includes a baffle plate 88 depicted in FIGS. 6 and 7.

The flow path for the blow-by gas and oil mixture is similar to that previously explained referencing FIG. 2. However, in the present embodiment, a baffle plate 88 is not positioned in a valve cover 90. Instead, the mixture flows from the valve cover 90 to the remote dry sump oil tank 78.

The mixture exits the valve cover 90 through a conduit 92 that connects the valve cover 90 to the dry sump oil tank 78. It then combines with an air and oil mixture in the tank 78 and the new resulting mixture is drawn through the baffle plate 88 contained in the tank 78. The mixture is drawn through the baffle plate 88 as a result of a pressure differential across the plate 88. The pressure in the intake system 36 is less than the pressure in the dry sump tank 78, causing the mixture to flow from the tank 78 to the intake system 36.

The dry sump oil tank 78 includes an oil fill tube 96, a baffle plate 88 and has four main volumes 98, 100, 102, 104. The first volume 98 is defined by a wall 106 generally running down the middle of the tank 78 and an outer wall 108 surrounding the tank 78. The first volume 98 also includes the oil fill tube 96. A cap 110 for the oil fill tube 96 is located on the top of the tank 78. The first volume 98 also includes an inlet 112 for the conduit 92 connecting the first volume 98 to the valve cover 28. The inlet 112 allows for a mixture of blow-by gases and oil to enter the tank 78 from the valve cover 28. As a result of the mixture impacting the wall 106, some of the oil within the mixture flows down the wall 106 and is removed from the mixture. The remaining mixture flows into the second volume 100 where it combines with a mixture of air and oil from the dry sump tank 78.

The second volume 100 generally includes the lower portion of the tank 78. The second volume 100 has a volume of air 114 and a volume of oil 115. The volume of air 114 exists to provide a communication path between the first volume 98 and the third volume 102. The oil volume 115 is generally great enough to keep the oil lines 82, 84 covered with oil. Lines 82 and 84 provide communication between the tank 78 and the oil pump 86. Line 84 contains oil flowing to the pump and line 82 contains oil flowing to the tank 78. The air and oil mixture present in the tank 78 combines with the mixture from the valve cover 28 and travels to the third volume 102.

The third volume 102 is located below the baffle plate 88. The fourth volume 104 is positioned above the baffle plate 88. The third volume 102 is generally defined by the wall 106 running down the center of the tank 78, the surrounding tank wall 108 and the baffle plate 88. The wall 106 forces the air/oil mixture from the valve cover 28 to flow through the baffle plate 88 if it leaves the tank 78. The baffle plate 88 performs a similar function to the baffle plate 40 depicted in FIG. 3. However, in one embodiment, baffle plate 88 is positioned substantially parallel to the ground. An edge 116 of the baffle plate 88 abuts the surrounding walls 108 of the tank 78 and the wall 106 running down the center of the tank 78. The mixture is drawn through the apertures 118 in the baffle plate 88 and into the fourth volume 104 as a result of a pressure differential across the plate 88. The portion of the mixture that does not pass through the apertures 118 impacts a first surface 120 of the baffle plate 88 or a portion of protrusions 122. The oil that impacts the first surface 120 falls back to the second volume 100 and mixes with the oil volume 115 contained therein. The protrusions 122 extending from the baffle 88 and surrounding the apertures 118 prevent the oil from passing over the apertures 118 and being drawn into the intake system 36.

The fourth volume 104 is generally defined by the wall 106 extending down the middle of the tank 78, the surrounding walls 108 of the tank 78 and the baffle plate 88. The fourth volume 104 is in communication with the intake system 36 through an outlet port 124. The outlet port 124 is in communication with the intake system 36 through the conduit 80. Communication between the fourth volume 104 and the intake system 36 causes the pressure differential providing for the flow across the baffle plate 88 and into the intake system 36.

The flow path for the mixture in the dry sump oil tank 78 is generally shown by the arrows in the figure. A mixture enters from the valve cover 28 through the conduit 92 and the inlet port 112. The mixture then enters the first volume 98 of the tank 78, then proceeds to the second volume 100. Next the mixture enters the third volume 102 and flows across the baffle plate 88 and into the fourth volume 104 where it may then exit the tank 78 through an outlet port 124 in communication with a conduit 80.

Figure 6:
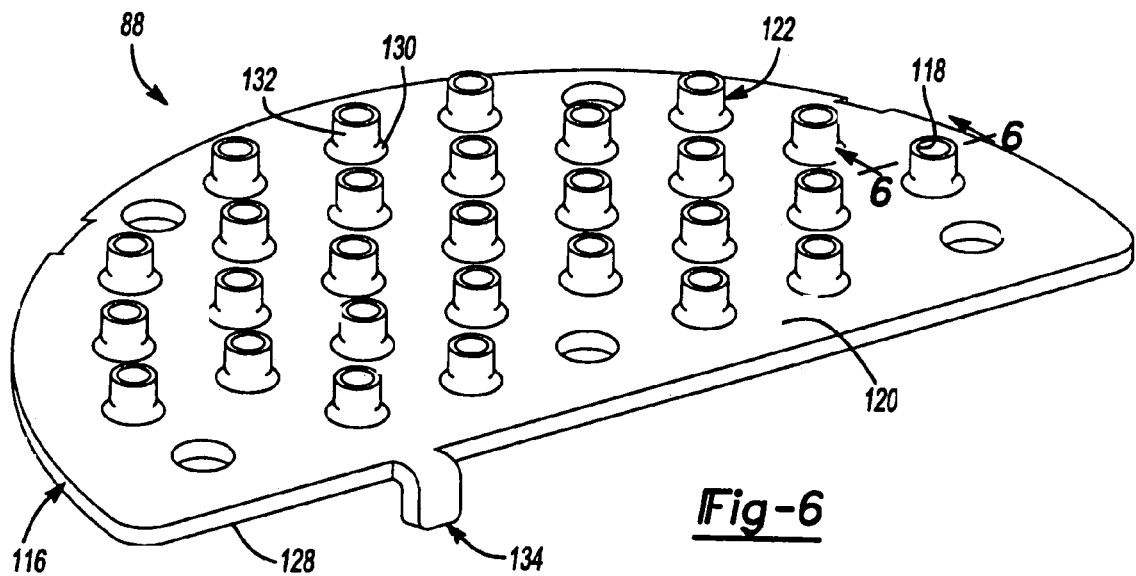
FIG. 6 is a perspective view of the baffle of the present invention in accordance with the teachings of the present invention.

FIGS. 6 and 7 further depict the baffle plate 88. Baffle plate 88 is shaped as a substantially planar thin sheet having the first surface 120 and an opposite second surface 128. Baffle plate 88 includes the plurality of apertures 118 surrounded by the protrusions 122. Each protrusion 122 consists generally of the first wall portion 130 and the second wall portion 132 surrounding the aperture 118. The first wall portion 130 extends from the first surface 120 of the baffle plate 88, generally opposing the direction of airflow, and has a conical shape. The second wall portion 132 is substantially cylindrical and extends substantially perpendicular to the first surface 120. The shape of protrusion 122 is merely exemplary and may take many other forms without departing from the scope of the present invention.

During operation, an air and oil mixture impacts the baffle plate 88 on the first surface 120 having protrusions 122 extending therefrom. A portion of the air and oil mixture passes through the apertures 118, but the remainder impacts the first surface 120 of the baffle plate 88 or protrusions 122. The protrusions 122 surrounding the apertures 118 prevent the oil that has impacted the first surface 120 of the baffle plate 88 from passing over the apertures 118 and being drawn into the fourth volume 104. Instead, the oil that has impacted the baffle plate 88 falls from the first surface 120 into oil volume 115. The edge surface 116 has a tab 134 extending therefrom for attachment with wall 106.

A further embodiment of the present invention could include the features found in FIGS. 2 and 4. The embodiment of FIG. 4 could include one or more baffle plates 40 depicted in FIG. 2. In this embodiment the mixture of oil and blow-by gases would first flow past the baffle plate 40 shown in FIG. 2, providing for an initial reduction in oil content of the mixture. The mixture would then proceed as previously explained with reference to FIG. 4. The mixture would combine with the air and oil mixture in the dry sump tank 78. This new mixture would then have its oil content further reduced as a result of being drawn through a baffle plate 88 in the tank 78.

Furthermore, the foregoing discussion discloses and describes merely exemplary embodiments of the present invention. One skilled in the art will readily recognize from such discussion, and from the accompanying drawings and claims, that various changes, modifications and variations may be made therein without department from the spirit and scope of the invention as defined in the following claims.

The invention claimed is:

1. A baffle plate for separating air and oil comprising:
    a first surface;
    a second surface generally parallel to said first surface;
    an aperture extending through said plate; and
    a protrusion at least partially surrounding said aperture, said protrusion outwardly extending from said second surface of said plate, said plate adapted to be vertically positioned in an internal combustion engine at a location in communication with an air intake system, wherein a portion of a mixture of air and oil flows through said aperture in a direction from said second surface to said first surface and a portion of said mixture contacts said second surface to separate said oil from the mixture, said protrusion being operable to restrict said oil separated from the mixture from passing over said aperture.

2. A baffle plate as claimed in claim 1, wherein said baffle plate is disposed in a dry sump oil tank between a chamber containing oil and a second chamber generally containing air in communication with an induction system.

3. A baffle plate as claimed in claim 1, wherein said baffle plate contains a plurality of apertures.

4. A baffle plate as claimed in claim 1, wherein said protrusion circumferentially encompasses said aperture and extends beyond said second surface of said baffle plate a distance greater than a minimum size of said aperture.

5. A baffle plate as claimed in claim 4 wherein said protrusion has a substantially cylindrically shaped portion.

6. A baffle plate as claimed in claim 5 wherein said cylindrically shaped portion defines an axis positioned substantially parallel to said direction of said air and oil flow.

7. A positive crankcase ventilation system comprising:
an internal combustion engine having a cavity containing a mixture of air and oil;
an air intake system having a fresh air inlet and a positive crankcase ventilation inlet; and
a baffle plate positioned in a passageway between the cavity and the positive crankcase ventilation inlet, said baffle plate including at least one aperture extending through said plate and a protrusion at least partially surrounding said aperture, said protrusion outwardly extending from a surface of said plate that is vertically oriented relative to the ground, wherein a portion of a mixture of air and oil flows through said aperture and a portion of said mixture contacts said surface to separate said oil from the mixture.

8. A positive crankcase ventilation system as claimed in claim 7, wherein said engine includes a head and a valve cover, said baffle plate being positioned therebetween.

9. A positive crankcase ventilation system as claimed in claim 7, wherein said baffle plate is positioned within a dry sump tank located remotely from said engine.

10. A positive crankcase ventilation system as claimed in claim 9, wherein said dry sump tank includes a plurality of interconnected chambers, said baffle plate separating two of said plurality of chambers.

11. A positive crankcase ventilation system as claims in claim 10 wherein said baffle plate is positioned substantially parallel to the ground.

12. A positive crankcase ventilation system as claimed in claim 7, wherein said baffle plate contains a plurality of apertures.

13. A positive crankcase ventilation system comprising:
an internal combustion engine having a cavity containing a mixture of air and oil;
an air intake system having a fresh air inlet and a positive crankcase ventilation inlet; and
two baffle plates positioned in a passageway between the cavity and the positive crankcase ventilation inlet, each of said baffle plates having a vertical orientation with respect to the ground and including at least one aperture extending through said plate and a protrusion at least partially surrounding said aperture, said protrusion outwardly extending from a surface of one of said plates and having a distal end spaced apart from the other of said two baffle plates, wherein a portion of a mixture of air and oil flows through said aperture and a portion of said mixture contacts said surface to separate said oil from the mixture, wherein said two baffle plates are arranged substantially parallel to and spaced apart from one another, said two baffle plates being integrally formed with one another and interconnected by an end portion extending substantially perpendicular to said baffle plates.

14. A positive crankcase ventilation system as claimed in claim 13, wherein the end portion is substantially vertically oriented relative to the ground.

15. The positive crankcase ventilation system as claimed in claim 13, further including a flange substantially perpendicularly extending from one of the baffle plates, the flange being adapted to mount the baffle plate within the passageway.

16. A method of separating air and oil within an, internal combustion engine having a baffle plate, which is vertically positioned with respect to the ground, and having at least one aperture extending through said baffle plate and a protrusion at least partially surrounding said aperture, the method comprising:
positioning the baffle plate above a volume of oil;
drawing combustion gases through apertures in the baffle plate;
depositing oil on a surface of the baffle plate adjacent the apertures to separate air from oil; and
restricting the oil deposited on the surface from passing over one of the apertures.

17. The method of claim 16 further including positioning the protrusions to extend substantially parallel to the ground thereby restricting the oil deposited on the surface of the baffle plate from entering the aperture.

18. The method of claim 17 further including positioning a plurality of baffle plates spaced apart from one another such that the combustion gases are forced to pass through apertures in each of the baffle plates.

19. The method of claim 16, further including positioning said baffle plate such that said protrusion is extending in the direction opposite the direction of flow of a mixture of air and oil.

20. The method of claim 16, further including positioning said baffle plate above a volume of oil in a dry sump oil tank.

21. The method of claim 16, further including positioning said baffle plate between a head and a valve cover of the internal combustion engine.

* * * * *